(12) United States Patent
Manglik (10) Patent No.: US 10,227,897 B2
(45) Date of Patent: Mar. 12, 2019

(54) ENHANCED DRY-COOLING SYSTEM AND METHOD FOR INCREASING POWER PLANT EFFICIENCY AND OUTPUT

(71) Applicant: University of Cincinnati, Cincinnati, OH (US)

(72) Inventor: Raj M. Manglik, Cincinnati, OH (US)

(73) Assignee: University of Cincinnati, Cincinnati, OH (US)

(*) Notice: Subject to any disclaimer, the term of this patent is extended or adjusted under 35 U.S.C. 154(b) by 127 days.

(21) Appl. No.: 15/514,007

(22) PCT Filed: Sep. 25, 2015

(86) PCT No.: PCT/US2015/052231
§ 371 (c)(1),
(2) Date: Mar. 24, 2017

(87) PCT Pub. No.: WO2016/049462
PCT Pub. Date: Mar. 31, 2016

(65) Prior Publication Data
US 2017/0248035 A1     Aug. 31, 2017

Related U.S. Application Data

(60) Provisional application No. 62/055,833, filed on Sep. 26, 2014.

(51) Int. Cl.
*F01K 9/00* (2006.01)
*F28D 20/02* (2006.01)

(52) U.S. Cl.
CPC ............ *F01K 9/003* (2013.01); *F28D 20/025* (2013.01)

(58) Field of Classification Search
CPC ...................... F25B 2339/042; F25B 2400/24
See application file for complete search history.

(56) References Cited

U.S. PATENT DOCUMENTS

| 4,449,368 A | 5/1984 | Haynie |
| 6,035,642 A | 3/2000 | Peletz, Jr. et al. |
| 7,730,712 B2 | 6/2010 | Sharma et al. |
| 8,350,442 B2 | 1/2013 | Akutsu et al. |

(Continued)

FOREIGN PATENT DOCUMENTS

| WO | 2013039926 A1 | 3/2013 |
| WO | 2014194400 A1 | 12/2014 |

OTHER PUBLICATIONS

Arthur E. Bergles and Raj M. Manglik, "Current Progress and New Developments in Enhanced Heat and Mass Transfer," Journal of Enhanced Heat Transfer, 20 (1): 1-15 (2013).

(Continued)

*Primary Examiner* — Cassey D Bauer
(74) *Attorney, Agent, or Firm* — Dinsmore & Shohl LLP (57) ABSTRACT

The presently disclosed subject matter relates to enhanced dry-cooling systems and methods. More specifically, the presently disclosed subject matter relates to enhanced dry-cooling systems for increasing power plant efficiency and output. One embodiment of the present disclosure is directed to dry-cooling system for increasing power plant efficiency and output. The dry-cooling system comprises an air-cooled condenser and an air cooling system in fluid communication with the air-cooled condenser.

27 Claims, 3 Drawing Sheets

(56) References Cited

U.S. PATENT DOCUMENTS

| | | |
|---|---|---|
| 8,955,322 B2 | 2/2015 | Bronicki et al. |
| 2006/0137853 A1* | 6/2006 | Haller .................... B60H 1/005 165/42 |
| 2009/0241546 A1 | 10/2009 | Hegazy |
| 2010/0031655 A1 | 2/2010 | Brown |
| 2011/0023506 A1 | 2/2011 | Day et al. |
| 2012/0047891 A1* | 3/2012 | Rosenfeld ............... F25B 25/00 60/652 |
| 2013/0298568 A1 | 11/2013 | Pierson et al. |

OTHER PUBLICATIONS

R. K. Kapooria et al, "An analysis of a thermal power plant working on a Rankine cycle: a theoretical investigation"; Journal of Energy in Southern Africa, vol. 19, No. 1, Feb. 2008.

Lucien Y. Bronicki, "Organic Rankine Cycle Power Plant for Waste Heat Recovery," Ormat Technologies, Inc. 2005.

\* cited by examiner

ENHANCED DRY-COOLING SYSTEM AND METHOD FOR INCREASING POWER PLANT EFFICIENCY AND OUTPUT

RELATED APPLICATION

This application claims benefit of U.S. Provisional Application Ser. No. 62/055,833, filed Sep. 26, 2014, which application is hereby incorporated by reference in its entirety.

TECHNICAL FIELD

The presently disclosed subject matter relates to enhanced dry-cooling systems and methods. More specifically, the presently disclosed subject matter relates to enhanced dry-cooling systems for increasing power plant efficiency and output.

BACKGROUND OF THE INVENTION

With increasing population, evolving migration patterns, and climate change, large parts of the world are expected to experience water shortages over next few decades. New technologies that reduce water usage will have a profound impact on alleviating water scarcity. One particular area of interest is water dissipated and lost to the atmosphere during electricity generation. For electricity generation in electrical power plants, large amounts of latent heat carried by low temperature steam from turbine exhausts needs to be removed and condensed into water for completion of the Rankine cycle. Typically, low temperature latent heat is removed by the use of large amounts of cooling water, usually supplied from cooling water towers. However, this "wet-cooling method" consumes very large amounts of water.

In contrast to wet-cooling methods and systems, "dry-cooling" methods and systems directly dissipate the latent heat from steam into ambient air without using a lot of water. However, with currently available technology, power producers have not embraced the use of dry-cooling methods and systems because of both high operating costs and thermodynamic limitations on performance when ambient temperatures are high.

Therefore, there remains a pressing need to improve the efficiency and power output of power plants based on Rankine cycles, particularly those utilizing dry-cooling methods and systems.

SUMMARY

Embodiments of the present disclosure meet these needs by providing a dry-cooling system and method for increasing power plant efficiency and output.

One embodiment of the present disclosure is directed to dry-cooling system for increasing power plant efficiency and output. The dry-cooling system comprises an air-cooled condenser and an air cooling system in fluid communication with the air-cooled condenser. The air cooling system comprises an air cooling loop and a recharging loop. The air cooling loop comprises an air cooler comprising a heat exchanger and in valve-controlled fluid communication with a source of ambient air, a thermal energy storage unit configured to contain a thermal energy storage material, and a system of valve-controlled conduits configured to cycle a heat transfer fluid between the heat exchanger and the thermal energy storage unit. The recharging loop comprises a second air cooler comprising a second heat exchanger and in valve-controlled fluid communication with a source of ambient air, the thermal energy storage unit, and a second system of valve-controlled conduits configured to cycle a second heat transfer fluid between the thermal energy storage unit and the second heat exchanger.

Another embodiment of the present disclosure is directed to a dry-cooling method for increasing power plant efficiency and output. The method comprises receiving steam from a steam source and air cooling the steam via a supply of air. The method further comprises transferring latent heat from the supply of air to latent heat of a first heat exchanger, transferring the latent heat of the first heat exchanger to stored latent heat of a thermal storage material, and transferring the stored latent heat of the thermal storage material to latent heat of a second heat exchanger, and dissipating latent heat from the second heat exchanger. The steps of transferring latent heat from the first supply of air to latent heat of a first heat exchanger and transferring the latent heat of the first heat exchanger to stored latent heat of a thermal storage material occur at a time when the ambient temperature is higher than the ambient temperature at the time the stored latent heat of the thermal storage material is transferred to latent heat of a second heat exchanger and the latent heat of the second heat exchanger is dissipated.

Additional features advantages of the embodiments described herein will be set forth in the detailed description and claim which follow, and in part will be readily apparent to those skilled in the art from that description and claims or recognized by practicing the embodiments described herein.

DETAILED DESCRIPTION

Particular details of various embodiments of the presently disclosed systems and methods are set forth to illustrate certain aspects and not to limit the scope of the disclosure. It will be apparent to one of ordinary skill in the art that modifications and variations are possible without departing from the scope of the embodiments defined in the appended claims. More specifically, although some aspects of embodiments of the present disclosure may be identified herein as preferred or particularly advantageous, it is contemplated that the embodiments of the present invention are not necessarily limited to these preferred aspects.

Unless defined otherwise, all technical and scientific terms used herein have the same meaning as commonly understood by one of ordinary skill in the art to which the presently-disclosed subject matter belongs.

There is a pressing need for new technologies that will reduce water usage. One particular area of interest is water dissipated to the atmosphere during electricity generation. In contrast to wet-cooling systems and methods, dry-cooling systems and methods directly dissipate latent heat from steam into ambient air without using a lot of water. However, use of current dry-cooling systems and methods is limited because of both high operating costs and thermodynamic limitations on performance when ambient temperatures are high. Thus, there is a need for improved dry-cooling methods and systems that will improve the efficiency and power output of power plants based on Rankine cycles. Embodiments of the present disclosure meet these needs by providing enhanced dry-cooling systems and methods for increasing power plant efficiency and output.

Figure 1:
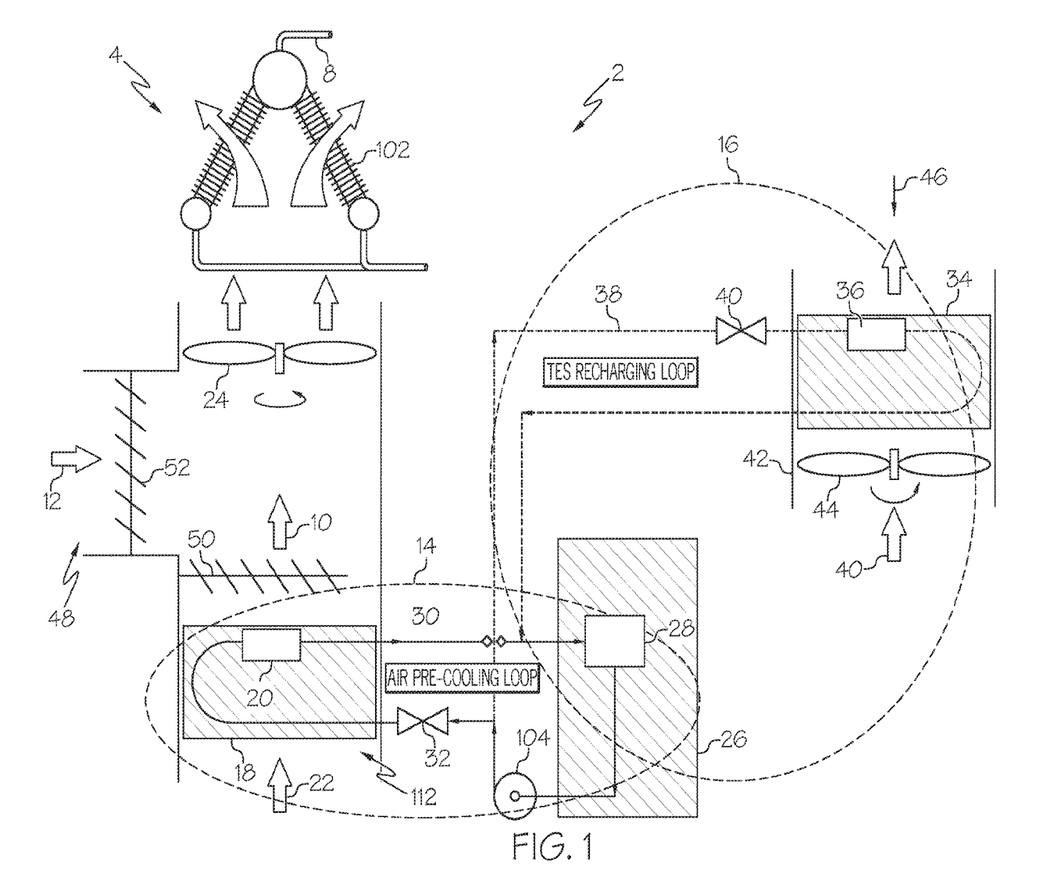
FIG. 1 is a schematic diagram of the dry-cooling system.

As illustrated in FIG. 1, in various embodiments of the presently disclosed subject matter a dry-cooling system 2 for increasing power plant efficiency and output is provided. The dry-cooling system 2 comprises an air-cooled condenser 4, such as known in the art. Preferably, the air-cooled condenser is air-cooled condensing heat exchanger (heat exchanger 102), as are known in the art. The heat transfer on the air-side of the air-cooled condenser 4 can be enhanced by incorporating novel helical-vortex-flow-inducing enhanced surfaces and modifying the tubular geometry to augment the heat transfer coefficient. Such enhanced surfaces can potentially include helically-wavy-disrupted fins (to periodically disrupt boundary layer growth and generate helical swirl in the air flow path), converging-diverging slotted or perforated fins (which not only produce enhanced flow mixing but significantly relax frictional losses), fins and bare tube with and graded (progressively larger) structured roughness on their surface, and longitudinally twisted oval or flat tubes, as are known in the art.

The air cooled condenser 4 can be configured to fluidly receive steam from a steam source (e.g. through wind pipes 8) and to air cool the steam via a supply of air. The supply of air can comprise a first 10 and second 12 supply of air. The steam source can be a turbine (e.g. a turbine in a power plant, including but not limited to an electrical power plant, a nuclear power plant, a solar thermal power plant, a gas-fired power plant, a coal-fired power plant, etc.). An air cooling system 100 is in fluid communication with the air-cooled condenser 4. A non-limiting example of how the air cooling system 100 can be configured to be in fluid communication with the air-cooled condenser is through duct system 112. The air cooling system 100 includes an air cooling loop system 14 and a recharging loop system 16.

The air cooling loop system 14 includes an air cooler 18. The air cooler 18 includes a heat exchanger 20, as are known in the art. Non-limiting examples of such a heat exchanger 20 include tube fin and plate fin heat exchangers, as are known in the art. In certain embodiments, the heat exchanger 20 is an air to liquid heat exchanger, as are known in the art. The air cooler 18 may be optimized for air-side and liquid-side heat transfer enhancement. Such enhancements can include, for example and not by way of limitation, novel vortex-flow-inducing surfaces and modified extended surface cores in both the air-side and liquid coolant side, as are known in the art, so as to achieve very high heat transfer coefficients.

The air cooler 18 is in valve-controlled fluid communication with a source of air. In certain embodiments, the air cooler 18 may be in fluid communication with ambient temperature air 22 (e.g. air that is initially external to the system and from the surrounding environment). A non-limiting example of how the air cooling system 100 can be configured to be in valve-controlled fluid communication with a source of air is through a duct system 12. In particular embodiments, the duct system 112 is capable of providing ducted ambient wind. The dry-cooling system 2 can further include a fan or blower 24 that is used to blow the first supply of air 10 (e.g. which may be supplied through the duct system 112) to the air-cooled condenser 4. Latent heat is transferred from the ambient temperature air 22 that is passed through the air cooler 18 (e.g. carried from the surrounding environment through the duct system) to latent heat of the heat exchanger 20. This results in cooling the ambient temperature air 22 that is passed through the air cooler 18.

The air cooling loop system 14 further includes a thermal energy storage unit 26 (e.g. a container) that is configured to contain a thermal energy storage material 28. In certain embodiments, the thermal energy storage unit 26 comprises a thermal energy storage material 28 (e.g. in a heat exchanger). Non-limiting examples of such heat exchangers include tube fin, plate fin, and plate-and-frame heat exchangers, as are known in the art. In certain embodiments, the thermal energy storage material 28 is a liquid to solid phase change thermal storage material, as are known in the art. In more particular embodiments, the phase change thermal storage material is a liquid to solid phase change thermal storage material, as are known in the art. Specific examples of phase change thermal storage materials are listed in Table 1 and 2, however other suitable phase change thermal storage materials are known in the art. The thermal energy storage unit 26 may be optimized for liquid-side and solid-side heat transfer enhancement. Such enhancements can include, for example and not by way of limitation, graded heat exchange matrices as are known in the art.

The air cooling loop further comprises a system of valve-controlled conduits 30 configured to cycle a heat transfer fluid between the heat exchanger 18 and the thermal energy storage unit 26. Thus, the heat exchanger 18 and the thermal energy storage unit 26 are in fluid communication through system of valve-controlled conduits 30. The system of valve-controlled conduits 30 can include a first valve 32. A first pump 104 can be included the air cooling loop system 14 to help cycle the first heat transfer fluid in system of valve-controlled conduits 30 between the heat exchanger 18 and the thermal energy storage material 28. The heat transfer fluid that is cycled between the heat exchanger 18 and the thermal energy storage material 28 through system of valve-controlled conduits 30 transfers the latent heat of the heat exchanger 18 into stored latent heat of the thermal storage material 28.

TABLE 1

Illustrative phase change materials suitable for the dry-cooling systems and methods.

| | Heat of Fusion (kJ/kg) | Melting Point (° C.) | $C_{p,f}$ (J/kg/K) | $\rho_f$ (kg/m$^3$) | $k_f$ (W/m/K) | $\alpha_f \times 10^8$ (m$^2$/s) | $\mu_f$ (N/s/m) | $C_{p,s}$ (J/kg/K) | $\rho_s$ (kg/m$^3$) | $k_s$ (W/m/K) |
|---|---|---|---|---|---|---|---|---|---|---|
| Paraffin | 235 | 5-76 | 2130 | 800 | 0.15 | 8 | 1 | 2890 | 900 | 0.25 |
| PEG/PEO | 145 | 20-55 | 2415 | 935 | 0.9 | 40 | 1-4 | 2800 | 1120 | 4 |

TABLE 2

Illustrative phase change materials suitable
for the dry-cooling systems and methods.

| | Heat of Fusion (kJ/kg) | Melting Point (° C.) |
|---|---|---|
| NaCl•Na$_2$SO$_4$•10H$_2$O | 286 | 18 |
| Sodium sulfate (Na$_2$SO$_4$•10H$_2$O) | 252 | 30 |
| Trimethylolethane (TME) | 218 | 32.4 |

The recharging loop system 16 includes a second air cooler 34. The second air cooler 34 comprises a second heat exchanger 36, as are known in the art. In certain embodiments, the second heat exchanger 36 is an air to liquid heat exchanger, as are known in the art. Non-limiting examples of such heat exchangers include tube fin, plate fin, and plate-and-frame heat exchangers, as are known in the art. The second air cooler 34 may be optimized for air-side and liquid-side heat transfer enhancement. Such enhancements can include, for example and not by way of limitation, novel vortex-flow-inducing surfaces and modified extended surface cores in both the air-side and liquid coolant side, as are known in the art, so as to achieve very high heat transfer coefficients. The second air cooler 34 is in valve-controlled fluid communication with a source of ambient air.

The recharging loop system 16 further includes the thermal energy storage unit 26 configured to contain a thermal energy storage material 28. In certain embodiments, the thermal energy storage unit 26 comprises the thermal energy storage material 28.

The recharging loop further comprises a second system of valved-controlled conduits 38 configured to cycle a second heat transfer fluid between the thermal energy storage unit 26 and the second heat exchanger 36. Thus, the thermal energy storage unit 26 and the second heat exchanger 36 are in fluid communication through the second system of valved-controlled conduits 38. The second system of valved-controlled conduits 38 can include a second valve 40. A second pump (not shown) can be included the recharging loop system 16 (e.g. in the second valved-controlled conduits 38) to help cycle the second heat transfer fluid in the second valved-controlled conduits 38 between the thermal energy storage unit 26 and the second heat exchanger 36. In certain embodiments, the first pump 104 and the second pump can be the same pump. The second heat transfer fluid is cycled between the thermal energy storage unit 26 and the second heat exchanger 36 through the second system of valved-controlled conduits 38 transfers the stored latent heat from the thermal storage material 28 into latent heat of the second heat exchanger 36.

The second air cooler 34 is in valve-controlled fluid communication with a source of ambient air 40 (e.g. air that is initially external to the system and from the surrounding environment). A non-limiting example of how the second air cooler 34 can be configured to be in valve-controlled fluid communication with a source of air is through a through a second duct system 42. The second duct system 42 is capable of providing ducted ambient wind. The system can further include a second fan or blower 44 that is used to blow the ambient air supplied through the second duct system 42 to the second air cooler 34. Latent heat is transferred from the second heat exchanger 36 to the ambient air temperature air passed through the second heat exchanger 46 (e.g. carried from the surrounding environment through the one or more second ducts). This results in latent heat being dissipated from the recharging loop system 16.

In certain embodiments, the system of valve-controlled conduits 30 and the second system of valve-controlled conduits 38 are controlled by the same valve(s). The valves 32, 40 of the system of valve-controlled conduits 30 and the second system of valve-controlled conduits 38 can be controlled manually or by a controller. For example, the valves 32, 40 can be controlled by a central processing unit. In other embodiments, the system of valve-controlled conduits 30 and the second system of valve-controlled conduits 38 are in fluid communication.

In some embodiments of the dry-cooling system 2, the system of valve-controlled conduits 30 is open (e.g., the first valve 32 is in an open position) and the second system of valve-controlled conduits 38 is closed (e.g., the second valve 40 is in the closed position) during daylight hours. Thus, the heat transfer fluid is cycled between the heat exchanger 20 and the thermal energy storage unit 26 through the system of valve-controlled conduits 30 during daylight hours. In this setting, the second heat transfer fluid is not cycled between the thermal energy storage unit 26 and the second heat exchanger 36 through the second system of valve-controlled conduits 38 during daylight hours. Again, the valves 32, 40 can be controlled manually or by a controller. For example, the valves 32, 40 can be controlled by a central processing unit that is programmed to open the system of valve-controlled conduits 30 and close the second system of valve-controlled conduits 38 during daylight hours.

In some embodiments of the dry-cooling system 2, the second system of valve-controlled conduits 38 is open (e.g., the second valve 40 is in an open position) and the system of valve-controlled conduits 30 is closed (e.g., the first valve 32 is in the closed position) during evening or night time hours. Thus, the second heat transfer fluid is cycled between the thermal energy storage unit 26 and the second heat exchanger 36 through the second system of valve-controlled conduits 38 during evening or night time hours. In this setting, the heat transfer fluid is not cycled between the heat exchanger 20 and the thermal energy storage unit 26 through the system of valve-controlled conduits 30 during daylight evening or night time hours. Again, the valves 32, 40 can be controlled manually or by a controller. For example, the valves 32, 40 can be controlled by a central processing unit that is programmed to open the second system of valve-controlled conduits 30 and close the system of valve-controlled conduits 38 during evening or night time hours.

In certain embodiments of the dry-cooling system 2, the heat transfer fluid and the second heat transfer fluid is the same heat transfer fluid. In preferred embodiments, the heat transfer fluid and/or the second heat transfer fluid is a liquid. In certain embodiments, the heat transfer liquid is any suitable organic or synthetic heat transfer liquid, as is known in the art.

The first supply of air 10 that is supplied to the air-cooled condenser 4 and used to air cool the steam is the cooled air 10 produced by the air cooling system 100. As described above, the first supply of air 10 supplied to the air-cooled condenser 4 and used to cool the steam is provided by the air-cooling system 100 through, for e.g., the one or more first ducts 30. More particularly, the first supply of air 10 is the cooled air produced by the air cooler 18. The second supply of air 12 supplied to the air-cooled condenser 4 and used to air cool the steam is provided, by a source of ambient temperature air. This ambient air can be received, e.g., through a third duct system 48 that is in fluid communication with the air-cooled condenser 4. As described previously, the system can further include a first fan or blower 24 that is used to blow the first supply of air 10 and the second supply of air 12 to the air-cooled condenser 4.

In certain embodiments, the first duct system 112 and the third duct system 48 are the same one or more ducts. In other embodiments, the dry-cooling system 2 further comprises a first damper 50 in first duct system 12, and a second damper 52 in third duct system 48. The dampers 50, 52 can be controlled (e.g. opened or closed) manually or by a controller. For example, the dampers 50, 52 can be controlled by a central processing unit.

In some embodiments of the dry-cooling system 2, the first supply of air 10 is supplied to the air-cooled condenser 4 by the air cooling system 100 during daylight hours. In certain embodiments of the dry-cooling system 2, the air cooling system 100 cools the ambient first supply of air 10 that is provided to the air-cooled condenser 4 to less than about 22° C. In some embodiments, the first damper 50 in the first duct system 112 is open and the second damper 52 in the third duct system 48 is closed during daylight hours. Thus, the air-cooled condenser receives the first supply of air 10, and not the second supply of air 12, during daylight hours. Again, the dampers 50, 52 can be controlled manually or by a controller. For example, the dampers 50, 52 can be controlled by a central processing unit that is programmed to open the first damper 50 and close the second damper 52 during daylight hours.

In some embodiments of the dry-cooling system 2, the second supply of air 12 is supplied to the air-cooled condenser 4 during evening and/or night hours. In certain embodiments, the first damper 50 in the first duct system 112 is closed and the second damper 52 in the third duct system 48 is open so during evening or night time hours. Thus, the air-cooled condenser 4 receives the second supply of air 12, and not the first supply of air 10, during evening or night time hours. Again, the dampers 50, 52 can be controlled manually or by a controller. For example, the dampers 50, 52 can be controlled by a central processing unit that is programmed to open the second damper 52 and close the first damper 50 during daylight hours.

In certain embodiments of the dry-cooling system 2, various components can be configured in parallel succession. Thus, depending on the size and power requirements of the power plant, certain embodiments of the dry-cooling system 2 can include a plurality of the air cooler 18, the thermal energy storage unit 26, and/or the second air cooler 34 configured in a parallel configuration. For example, the air cooler 18, the thermal energy storage unit 26, and the second air cooler 34 can all be modular units/modules that are easily configured in a parallel configuration to facilitate implementation to different scales. Additionally, the dry-cooling system 2 can be implemented in newly constructed power plants, or can be retrofitted to existing power plants, thus eliminating the need for water cooling towers used to remove the latent heat carried by low temperature steam from turbine exhausts (also eliminating the large of amounts of water consumed in such a process).

In various embodiments, a dry-cooling method for increasing power plant efficiency and output is provided. The method comprises receiving steam from a steam source and air cooling the steam via a supply of air. The method further comprises transferring latent heat from the supply of air to latent heat of a first heat exchanger, thereby cooling the supply of air. Additionally, the method includes transferring the latent heat of the first heat exchanger to stored latent heat of a thermal storage material, transferring the stored latent heat of the thermal storage material to latent heat of a second heat exchanger, and dissipating latent heat from the second heat exchanger.

In some embodiments of the dry cooling method, the steps of transferring latent heat from the supply of air to latent heat of a first heat exchanger and the step of transferring the latent heat of the first heat exchanger to stored latent heat of a thermal storage material occur at a time when the ambient temperature is higher than the ambient temperature at the time the stored latent heat of the thermal storage material is transferred to latent heat of a second heat exchanger and the latent heat of the second heat exchanger is dissipated. For example, the steps of transferring latent heat from the supply of air to latent heat of a first heat exchanger and the step of transferring the latent heat of the first heat exchanger to stored latent heat of a thermal storage material can occur during daylight hours. Additionally, the steps of transferring the stored latent heat of the thermal storage material to latent heat of a second heat exchanger, and dissipating latent heat from the second heat exchanger can occur during the evening or night time hours.

In certain embodiments, the supply of air comprises a first supply of air and a second supply of air. The first supply of air is the cooled supply of air produced by transferring latent heat from the supply of air to latent heat of a first heat exchanger. The second supply of air is provided by a source of ambient temperature air, as discussed above in detail. In some embodiments of the dry cooling method, the step of air cooling the steam via a first supply of air occurs at a time when the ambient temperature is higher than the ambient temperature at the time of air cooling the steam via a second supply of air. For example, the step of air cooling the steam via the first supply of air can occur during the daylight hours, while the step of air cooling the steam via the second supply of air can occur during evening or night time hours.

In various embodiments of the dry-cooling method, the steam is air cooled by the first supply of air during daylight hours. In certain embodiments of the dry-cooling method, the first supply of air is cooled to a temperature of less than about 22° C. In some embodiments of the dry-cooling system, the steam is air cooled by the second supply of air during evening and/or night hours.

In some embodiments of the dry-cooling method, the thermal energy storage material is a liquid to solid phase change thermal storage material. In more particular embodiments, the phase change thermal storage material is a liquid to solid phase change thermal storage material.

In various embodiments of the dry-cooling method, the method is carried out using the dry-cooling system disclosed and described in detail above (with such details of the system being incorporated into the methods). As such, the method step of transferring latent heat from the first supply of air to latent heat of a first heat exchanger, and thereby cooling the first supply of air, comprises passing ambient temperature air through the air cooler, for example, through a first duct system. Additionally, the step of transferring the latent heat of the heat exchanger to stored latent heat of a thermal storage material comprises cycling the heat transfer fluid between the first heat exchanger and the thermal energy storage unit through a system of valve-controlled conduits. The step of transferring the stored latent heat of the thermal storage material to latent heat of a second heat exchanger comprises cycling the second heat transfer fluid between the thermal energy storage unit and the second heat exchanger through a second system of valve-controlled conduits. The step of dissipating latent heat from the second heat exchanger comprises passing ambient temperature air through the second heat exchanger, for example, through a second duct system.

Furthermore, in various embodiments of the dry-cooling method the step of air cooling the steam via the first supply of air comprises providing the cooled air produced by the ambient temperature air passed through the first air cooler to the air-cooled condenser, for example, through the a first duct system. Additionally, the step of air cooling the steam via the second supply of air comprises providing the second supply of air by a source of ambient temperature air to the air-cooled condenser, for example, through the a third duct system.

Figure 2:
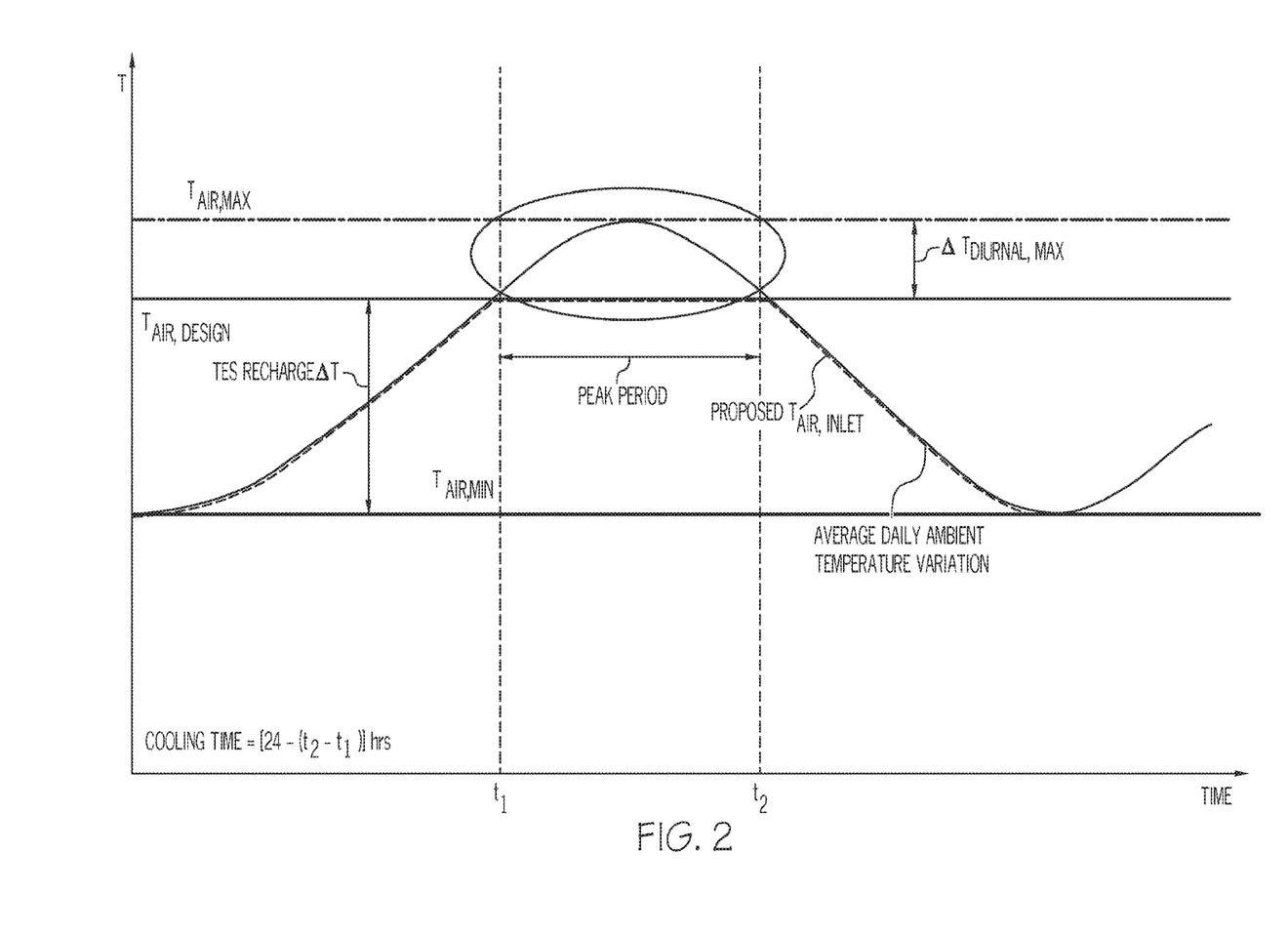
FIG. 2 is a schematic graph of daily temperature variation cycle and effective time durations for air cooling with the thermal energy storage unit (TES) and recharging with the second air cooler.

Thus, the presently-disclosed embodiments of the dry-cooling system and method are daytime peak-load shifting systems and methods that reduce the ambient air inlet temperature for air cooling, and which include an air cooler that transfers the heat load to a thermal energy storage unit. As described, the thermal energy storage unit operates over a range of temperatures and is recharged by the second air cooler enhanced heat exchanger. Thus, the ambient temperature can be lowered, during peak day-time periods (~6-to-8 hours daily, based upon geographical location), via the first air cooler that limits the inlet air temperature for the air-cooled condenser to <~22° C. This air cooler, which can be bypassed during non-peak day hours, is coupled to the thermal energy storage unit that operates over a range of daytime temperatures ($T_{Air,design}$~22° C.<$T_{diurnal,max}$≤ $TAir_{max}$; see FIG. 2) The thermal energy storage unit is then recharged by the second air cooler. The thermal energy storage unit can utilize encapsulated phase change materials that operate over a range of temperatures combining both sensible heat and latent heat energy storage, and arranged in graded heat-exchange matrices in the thermal energy storage unit so as to completely accommodate $\Delta T_{diurnal,max}$. The air cooler and the thermal energy storage unit, optionally operated with smart controls via a controller, accomplishes load leveling by shifting daytime peak heat load ($t_1$≤t≤$t_2$; FIG. 2) to nighttime hours [24−($t_1$−$t_2$)] when the thermal energy storage unit is recharged via the second air cooler to increase the overall power-plant efficiency and its thermal power output. By effectively cooling the inlet air to the air-cooled condenser, the presently disclosed dry-cooling system and method mitigates the second law limits on steam power plants due to ambient air temperatures, but also makes the air-cooled condenser more thermodynamically viable by offering a larger $\Delta T$ at all times of the day.

The air coolers may be optimized for air-side and liquid-side heat transfer enhancement (potentially resulting in an enhancement ~4-5 times over current industry baseline at fixed fan or pumping power). Such enhancements include novel vortex-flow-inducing surfaces in both the air-side and liquid coolant side so as to achieve very high heat transfer coefficients (as described above). These can be fabricated with low cost materials and advanced manufacturing.

Figure 3:
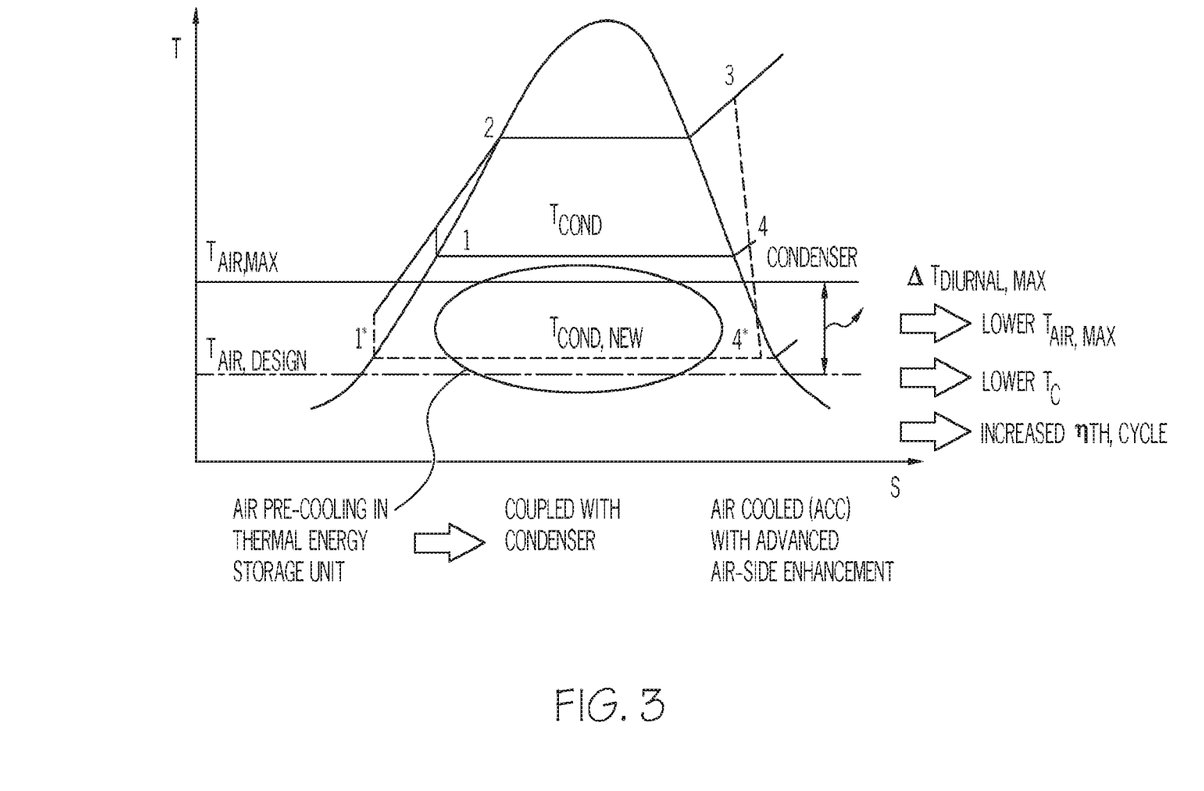
FIG. 3 is a schematic graph of Rankine cycle operation and its power output and efficiency improvements using the dry-cooling system.

The presently disclosed dry-cooling system and method provides increase in thermodynamic efficiency at high ambient air temperatures which in turn increases effective generation capacity, as shown in FIG. 3. The transformative aspects of this system are that enhanced surfaces of the air-cooled condenser, as are known in the art, are anticipated to increase both the heat transfer coefficient h and the surface area A. Moreover, by reducing the ambient air temperature, via the thermal energy storage unit, $\Delta T_{lm}$ is anticipated to increase and provide a compound increase in the air-cooled condenser heat transfer rate q and effectiveness, and lower the operating and capital costs compared to current baselines. Furthermore, reducing maximum diurnal air temperature in the air-flow path of the air-cooled condenser via the enhanced and compact air-side pre-cooler coupled with peak heat load shifting via the thermal energy storage unit is anticipated yield much lower $T_C$ and higher $\eta_{th,cycle}$ (FIG. 3), thereby producing higher thermal power output and making the entire system and method more economically viable.

Thus, the dry-cooling systems and methods, which allow for bypassing the air cooling loop system, shifts the second-law limiting daytime peak heat load due to high ambient dry-bulb temperature to evening and night time hours so as to significantly increase power-plant output. Furthermore, the cooling of inlet air to the air-cooled condenser by the air cooling loop system also substantially enhances the effectiveness of the air-cooled condenser. The presently disclosed dry-cooling system can result in no net water dissipation and enhanced power-plant efficiency, but can also result in lower costs.

In order that various embodiments may be more readily understood, reference is made to the following prophetic example which is intended to illustrate various embodiments, but does not limit the scope thereof.

Example 1

Assume typical conditions in El Dorado, N. Mex., for a 200 MWe power plant and the following:
1. The ambient temperature variation for a typical hot day as shown in FIG. 4, along with the expected cooled air temperatures (T shown is in degrees F.). 2. Operate in cooling mode for all the hours where $T_{amb}$>38° C. (from noon to 8 pm, or 8 hours) 3. Phase change material transition temperature ~32° C.

Air-cooled condenser design parameters:
Heat load: 293 MW
Air flow: 17,000 kg/s (corresponds to about 30 fans)
Air temperature rise: ~17.8° C.
To reduce inlet air temperature at peak temperature conditions from 42.2° C. to 38° C.: Heat load: 8/32×293 MW=73 MW.
First air cooler conditions:

$$T_{air,in}=T_{amb}=42.2° C.$$

$$T_{air,out}=38° C.$$

Assume for circulation water loop between the thermal energy storage unit and first air cooler:
Cold water temp leaving thermal energy storage unit: 35° C.
Hot water temperature returning to thermal energy storage unit: 38° C.
LMTD and (UA) of pre-cooler:

$$LMTD=((108-100)-(100-95))/\ln(8/5)=3.6° C.$$

$$UA_{aircooler}=0.25\times293/6.4=21 MW/K$$

If U~34 W/m²K (same as ACC)
And A=6.25×10⁵ m², or about 16 cells at ~37,000 m²/cell (about ½ size of ACC) The thermal energy storage unit has the same heat load and an LMTD=(10−5)/ln(10/5)=4° C. and a $(UA)_{req'd}$=6.4/7.2*21=18.5 MW/K (this is a conservative estimate, as the actual values can be ascertained only through the completion of the proposed R&D project). Also note that there are enough nighttime hours (24−8=16 hours) at low enough temperature to recharge the thermal energy storage unit.

Thus the additional power generated due to this pre-cooling: Assume during the 8 hours, the average temperature reduction of the inlet air is 2.2° C. (~4.4° C. at peak; and 0 at both ends). For Q/ITD of the air-cooled condenser constant, this implies an average reduction in condensing temperature of 2.2° C. and an average reduction in turbine exhaust pressure of about ~1.7 kPa. Considering a typical turbine power curve, this implies additional gross turbine output of about 16 MW, or ~130 MWh over the 8 hour period. For a site chosen in southern Nevada, there are about 700 hours/year over 38° C. At an average increase of 16 MW for 700 hours, we gain over 11,000 MWh/year. At $70/MWh this gains additional revenue of $770,000 per year. And over a 25 year plant life that totals~$20 million.

If it is assumed an amortization factor of 7%, then an additional capital expenditure of $11 million would be justified to save $770,000 per year (all other things being equal).

Finally for a typical 500 MW plant, these savings scale by a factor of 2.5 (over the 200 MW estimate).

Moreover, estimates for a typical 25-module air-cooled condenser currently employed in the industry, a competitive price is about $53/kW$_{th}$. With a doubling of the air-side heat transfer coefficient (2× baseline), with negligible fan-power loss, the cost of the new air-cooled condenser modules would be $48/kW$_{th}$.

The invention claimed is:

1. A dry-cooling system for increasing power plant efficiency and output, the system comprising:
   a) an air-cooled condenser; and
   b) an air cooling system in fluid communication with the air-cooled condenser, said air cooling system comprising:
      (i) an air cooling loop, said air cooling loop comprising:
         an air cooler comprising a heat exchanger, wherein the air cooler is in valve-controlled fluid communication with a source of ambient air;
         a thermal energy storage unit configured to contain a thermal energy storage material; and
         a system of valve-controlled conduits configured to cycle a heat transfer fluid between the heat exchanger and the thermal energy storage unit;
      (ii) a recharging loop, said recharging loop comprising:
         a second air cooler comprising a second heat exchanger, wherein the second air cooler is in valve-controlled fluid communication with a source of ambient air;
         the thermal energy storage unit; and
         a second system of valve-controlled conduits configured to cycle a second heat transfer fluid between the thermal energy storage unit and the second heat exchanger.

2. The system of claim 1, the thermal energy storage unit comprising thermal storage material.

3. The system of claim 2, the thermal storage material comprising a phase change thermal storage material.

4. The system of claim 3, wherein the phase change thermal storage material is a liquid to solid phase change thermal storage material.

5. The system of claim 1, wherein the first heat exchanger is an air to liquid heat exchanger.

6. The system of claim 1, wherein the second heat exchanger is an air to liquid heat exchanger.

7. The system of claim 1, wherein the system of valve-controlled conduits and the second system of valve-controlled conduits are controlled by the same valve(s).

8. The system of claim 1, wherein the system of valve-controlled conduits and the second system of valve-controlled conduits are in fluid communication.

9. The system of claim 1, wherein the system of valve-controlled conduits is open and the second system of valve-controlled conduits is closed during daylight hours.

10. The system of claim 1, wherein the second system of valve-controlled conduits is open and the system of valve-controlled conduits is closed during evening or night time hours.

11. A dry-cooling method for increasing power plant efficiency and output, the method comprising:
   receiving steam from a steam source;
   air cooling the steam via a supply of air;
   transferring latent heat from the supply of air to latent heat of a first heat exchanger, thereby cooling the supply of air;
   transferring the latent heat of the first heat exchanger to stored latent heat of a thermal storage material;
   transferring the stored latent heat of the thermal storage material to latent heat of a second heat exchanger; and
   dissipating latent heat from the second heat exchanger;
wherein the steps of transferring latent heat from the supply of air to latent heat of a first heat exchanger and transferring the latent heat of the first heat exchanger to stored latent heat of a thermal storage material occur at a time when the ambient temperature is higher than the ambient temperature at the time the stored latent heat of the thermal storage material is transferred to latent heat of a second heat exchanger and the latent heat of the second heat exchanger is dissipated;
wherein said method is performed using a dry-cooling system comprising:
   a) an air-cooled condenser; and
   b) an air cooling system in fluid communication with the air-cooled condenser, said air cooling system comprising:
      (i) an air cooling loop, said air cooling loop comprising:
         an air cooler comprising a heat exchanger, wherein the air cooler is in valve-controlled fluid communication with a source of ambient air;
         a thermal energy storage unit configured to contain a thermal energy storage material; and
         a system of valve-controlled conduits configured to cycle a heat transfer fluid between the heat exchanger and the thermal energy storage unit;
      (ii) a recharging loop, said recharging loop comprising:
         a second air cooler comprising a second heat exchanger, wherein the second air cooler is in valve-controlled fluid communication with a source of ambient air;
         the thermal energy storage unit; and
         a second system of valve-controlled conduits configured to cycle a second heat transfer fluid between the second heat exchanger and the thermal energy storage unit.

12. The method of claim 11, wherein the steam is air cooled by the supply of air during daylight hours.

13. The system of claim 11, wherein the supply of air is cooled to less than about 22° C.

14. The method of claim 11, wherein the steam is air cooled by a second supply of air during evening and/or night hours.

15. The method of claim 11, wherein the thermal storage material comprises a phase change thermal storage material.

16. The method of claim 15, wherein the phase change thermal storage material is a liquid to solid phase change thermal storage material.

17. The method of claim 16, wherein the first heat exchanger is an air to liquid heat exchanger.

18. The method of claim 11, wherein the second heat exchanger is an air to liquid heat exchanger.

19. The method of claim 11, wherein the step of transferring latent heat from the supply of air to latent heat of a first heat exchanger, comprises: passing the supply of through the heat exchanger of the air cooler.

20. The method of claim 11, wherein the step of transferring the latent heat of the heat exchanger to stored latent heat of a thermal storage material comprises: cycling the heat transfer fluid between the first heat exchanger and the thermal energy storage unit.

21. The method of claim 11, wherein the step of transferring the stored latent heat of the thermal storage material to latent heat of a second heat exchanger comprises: cycling the second heat transfer fluid between the thermal energy storage unit and the second heat exchanger.

22. The method of claim 11, wherein the step of dissipating latent heat from the second heat exchanger comprises: passing ambient temperature air through the second heat exchanger.

23. The method of claim 11, wherein the step of air cooling the steam via the supply of air comprises: providing the cooled air produced by the first air cooler to the air-cooled condenser.

24. The method of claim 11, wherein the system of valve-controlled conduits and the second system of valve-controlled conduits are controlled by the same valve(s).

25. The method of claim 11, wherein the system of valve-controlled conduits and the second system of valve-controlled conduits are in fluid communication.

26. The method of claim 11, wherein the system of valve-controlled conduits is open and the second system of valve-controlled conduits is closed during daylight hours.

27. The method of claim 11, wherein the second system of valve-controlled conduits is open and the system of valve-controlled conduits is closed during evening or night time hours.

* * * * *